United States Patent
Lombardo et al.

(10) Patent No.: US 10,272,371 B2
(45) Date of Patent: Apr. 30, 2019

(54) FILTERING CONTAINER

(71) Applicant: KX Technologies, LLC, West Haven, CT (US)

(72) Inventors: Andrew W. Lombardo, West Haven, CT (US); Stephen P. Huda, Shelton, CT (US); Malcolm R. Kahn, Franklin Lakes, NJ (US)

(73) Assignee: KX Technologies LLC, West Haven, CT (US)

( * ) Notice: Subject to any disclaimer, the term of this patent is extended or adjusted under 35 U.S.C. 154(b) by 830 days.

(21) Appl. No.: 13/729,849

(22) Filed: Dec. 28, 2012

(65) Prior Publication Data

US 2014/0186496 A1   Jul. 3, 2014

(51) Int. Cl.
*B01D 35/02* (2006.01)
*B01D 35/30* (2006.01)

(52) U.S. Cl.
CPC ........ *B01D 35/30* (2013.01); *B01D 2201/309* (2013.01)

(58) Field of Classification Search
CPC ........ B01D 29/15; B01D 29/21; B01D 29/33; B01D 29/333; B01D 27/08; B01D 35/02; B01D 35/30; B01D 2201/291; B01D 2201/296; B01D 2201/306; B01D 35/027; B01D 35/0276; B01D 2201/309; C02F 1/28; C02F 2307/02; C02F 1/002; A47G 21/004; A47G 21/18; B65D 77/83
USPC ....... 210/282, 437, 438, 450, 464, 466, 469, 210/472, 474, 453, 454, 459, 460, 461, 210/209, 501; 222/189.06, 189.07, 522, 222/519; 215/306, 388; 220/708, 705, 220/709
See application file for complete search history.

(56) References Cited

U.S. PATENT DOCUMENTS

| | | | | |
|---|---|---|---|---|
| 2,094,268 A * | 9/1937 | Friedman | | 239/33 |
| 2,550,797 A * | 5/1951 | Friedman | | 239/33 |
| 3,606,156 A * | 9/1971 | Homordodean | | 239/33 |
| 5,045,195 A | 9/1991 | Spangrud et al. | | |
| 5,609,759 A | 3/1997 | Nohren, Jr. et al. | | |
| 5,840,185 A | 11/1998 | Hughes et al. | | |
| 6,004,460 A * | 12/1999 | Palmer et al. | | 210/232 |
| 6,116,458 A * | 9/2000 | Dark | | 220/709 |
| 6,919,025 B2 * | 7/2005 | Cluff et al. | | 210/244 |
| 7,810,651 B2 | 10/2010 | Miga, Jr. | | |
| 2004/0164174 A1 * | 8/2004 | Day | | 239/33 |
| 2005/0121387 A1 * | 6/2005 | Kuennen et al. | | 210/503 |
| 2007/0280042 A1 * | 12/2007 | Yamanaka | | B65D 51/2821 366/185 |

(Continued)

*Primary Examiner* — Erik Kashnikow
*Assistant Examiner* — Ericson M Lachica
(74) *Attorney, Agent, or Firm* — DeLio, Peterson & Curcio, LLC; Robert Curcio

(57) ABSTRACT

A collapsible bag or compressible bottle container for accepting, holding, and filtering fluid. Fluid is filtered upon entry to the container or filtered upon egress. The filter media resides either in a removable cap, or in a second fluid-tight compartment attached to, and in fluid communication with, the container body. A one-way valve with unique one-time connection to a fluid source mitigates potential contamination from container overuse. A second collapsible layer is used in conjunction with the collapsible bag to accept compressed air that provides rigidity for the container body.

15 Claims, 12 Drawing Sheets

(56) References Cited

U.S. PATENT DOCUMENTS

| | | | |
|---|---|---|---|
| 2008/0067120 A1* | 3/2008 | Chatrath | B01D 63/02 210/435 |
| 2009/0188854 A1* | 7/2009 | Farrelly et al. | 210/282 |
| 2010/0187183 A1 | 7/2010 | Nelson et al. | |
| 2010/0193462 A1* | 8/2010 | Roth | A47G 19/2288 215/229 |
| 2010/0297299 A1* | 11/2010 | Epars | A23L 1/296 426/84 |
| 2011/0108560 A1* | 5/2011 | Ravelo | 220/705 |
| 2011/0233118 A1* | 9/2011 | Nelson | 210/117 |
| 2011/0300266 A1* | 12/2011 | Rinaldi et al. | 426/66 |
| 2013/0199989 A1* | 8/2013 | Carter et al. | 210/464 |
| 2014/0008302 A1 | 1/2014 | King | |

\* cited by examiner

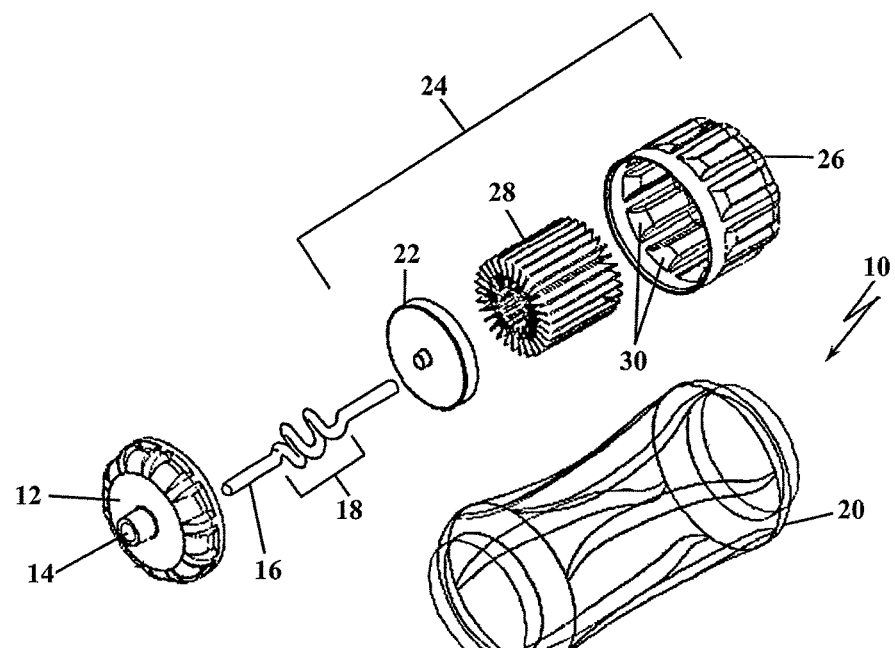
FIG. 1
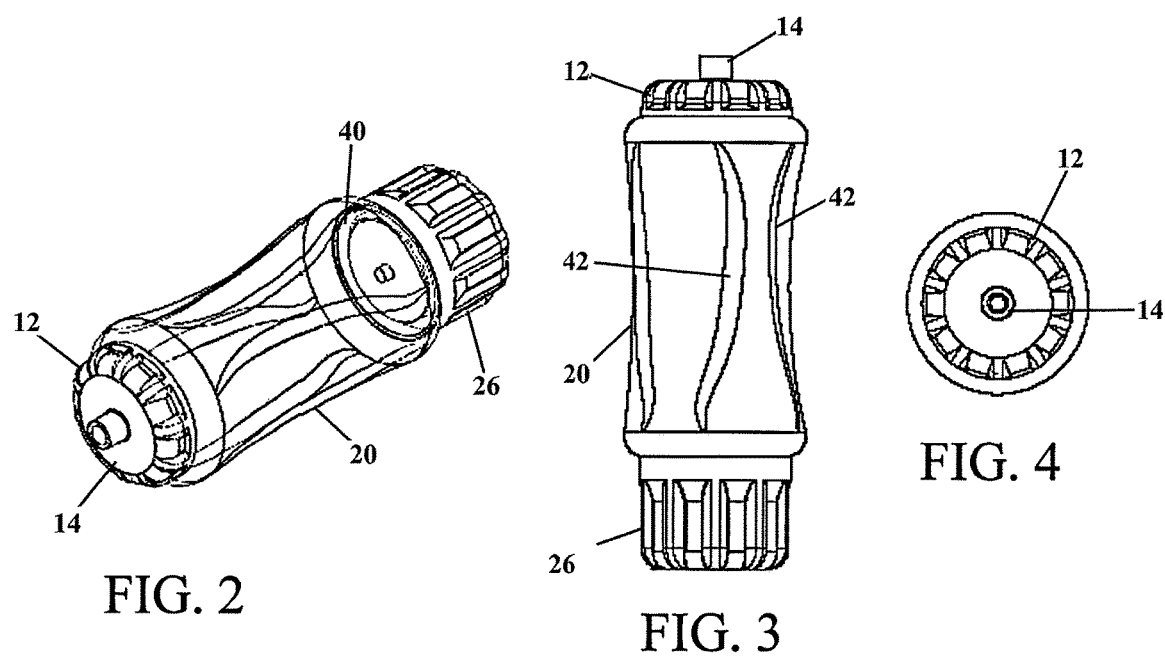
FIG. 2
FIG. 3
FIG. 4

FILTERING CONTAINER

BACKGROUND OF THE INVENTION

1. Field of the Invention

The present invention relates generally to liquid beverage containers or drinking devices, such as sports bottles or containers for water storage, and particularly to liquid multi-use supply bottles and single and/or multi-use collapsible bags that replace today's bottled water containers. More particularly, the present invention relates to a filtering system constructed within a liquid beverage container.

2. Description of Related Art

The bottled water industry has grown to over $18 billion dollars and produces some 29 billion bottles in the U.S. alone. The bottles are constructed of non-biodegradable material that creates a serious environmental problem and consume large amounts of petroleum in their manufacture. Moreover, the shipping of bottled water is costly based on the weight and bulk of the product, and it is inconvenient for consumers to transport and store when the water itself is abundant at the destination locations. The present invention addresses these and other issues with bottled water, while retaining the ease of use for consumers.

In response to concerns about water quality, many people regularly purchase bottled water or filter their own water for their homes and offices, and will often fill unfaltering sports bottle type containers with the water from these sources. Filtering devices are sold worldwide in the form of carafes and faucet mounted and countertop filter units. Over the past several years, reusable bottles, containing internal filtering devices (most often carbon and other contaminant absorbers) have become a popular replacement for standard bottled water. These bottles and their caps vary somewhat in shape and size, but are of the same general shape and function.

Furthermore, in times of natural disaster, such as earthquakes, tsunami, floods, and the like, where clean, drinkable water is in scarce supply, there exists a need for compact, packable water filtering containers that can be easily delivered to remote, hard-to-access areas affected by the disaster. Light, collapsible filtering containers capable of being packaged in large quantities and delivered quickly would provide needed capability for filtered water in these affected areas.

In addition, travelers and campers could significantly benefit from a collapsible container that isn't filled until one arrives at their destination.

In recent years, personal bottles with integrated filters have been developed. These systems are primarily based on some type of carbon filtration and typically target the removal of taste and odor components from the water. There are a wide variety of different designs and a wide range of performance in these systems. Existing personal filtering bottles typically incorporate a filter media containing housing attached to the top of the bottle. They are removed from the bottle along with the top. Based on their position, the bottle must be inverted in order for water to be drawn from the bottle. Thus, filtering containers of the prior art are typically inverted-use applications, whereby the filtering container is inverted (topside down) for drinking and filtering purposes. This is a necessity given that the filter media resides at the top of the container, typically in the upper half, or in the cap portion. Examples of such designs can be found in U.S. Pat. No. 7,810,651 for Miga, Jr., entitled "Water Bottle with Filtration Feature," and in U.S. Patent Publication No. 2012/0055862 for Parekh, entitled "Filtering Water Bottle." A common problem that arises in these designs is the inability to access all fluid from the bottle, since at low fluid levels, air is introduced as the bottle is inverted for drinking which defeats the suction or compression of the filtering container.

SUMMARY OF THE INVENTION

Bearing in mind the problems and deficiencies of the prior art, it is therefore an object of the present invention to provide filtering containers that remedy many of the problems associated with current embodiments, while adding enhancements in convenience and cost.

It is another object of the present invention to provide a collapsible filtering container that is light in weight, uses significantly less non-biodegradable materials, and can easily be filled with at a location with an array of waters of questionable quality to produce potable water on demand.

It is a further object of the present invention to provide a filtering container that allows for accessing all of the fluid in the container without inverting the filtering container, and without introducing air during suction of the fluid or compression of the filtering body.

Still other objects and advantages of the invention will in part be obvious and will in part be apparent from the specification.

The above and other objects, which will be apparent to those skilled in the art, are achieved in the present invention which is directed to a filtering container comprising: a container body having a first end and a second end opposite the first end; a container cap having an aperture extending therethrough and a mouthpiece in fluid communication with the container cap aperture, the container cap sealingly engageable with the first end of the container body; a filter housing engageable with the second end of the container body, having a hollow inner portion for receiving a filter media; a filter end cap having an end cap aperture and attachable to the filter media, the filter end cap having an outer diameter that is less than an outer diameter of the container body second end, such that an annular gap is formed for liquid ingress to the filter media; and an extendable hollow tube sealably connected at a first end to the end cap aperture and sealably connected at an opposite second end to the container cap aperture, the extendable hollow tube extending from the end cap aperture to the container cap aperture; wherein the filter housing is engageable with the filter media, the filter media adapted to purify a fluid passing therethrough, and wherein the extendable hollow tube first end is in fluid communication with the filter media egress, such that fluid contained in the container body is drawable radially through the filter media, and exits the filter media through the end cap aperture to the extendable hollow tube.

The container body may include a collapsible, fluid-tight bag constructed of transparent plastic or translucent plastic.

The extendable hollow tube includes a flexible, extendable portion intermediate the tube first and second ends. The extendable hollow tube is extendable beyond the length from the end cap aperture to the container cap mouthpiece.

The filter media is removably attached to the filter housing, and may include a membrane, paper-like filters, carbon and other absorbent media, and could also contain antimicrobial agents.

The filtering container may include perforations or apertures located at the second end of the bottle body to provide influent fluid to the filter media.

The filter housing may include inwardly directed guide ribs to center the filter media and allow ingress fluid to enter the filter media radially inwards.

The filtering container is made of a flexible plastic sufficient to allow a collapsing or squeezing force on the container body to help force fluid through the filter and upward through the extendable hollow tube.

The filtering container may also include an outer membrane for entrapping air between the outer membrane and the container body, such that the filtering container is more rigid and capable of standing upright when air is pumped into the membrane.

In a second aspect, the present invention is directed to a filtering container comprising: a container body having a first end having a top opening and a second end opposite the first end; a container cap having a container cap opening extending therethrough and a mouthpiece in fluid communication with the container cap opening, the container cap sealingly engageable with the first end opening of the container body; a filter housing engageable with the second end opening of the container body and a filter end cap having a end cap opening and attachable to filter media within the filter housing; the filter media removably secured within the filter housing and attachable to the end cap, the filter media egress in fluid communication with the end cap opening; a hollow tube extending from the end cap opening to the container cap opening; wherein the filter housing is engageable with the filter media, the filter media purifying a fluid passing therethrough, and wherein the fluid contained in the container body is drawn through the filter.

The container cap may include a straw formed mouthpiece protruding from an external side of the container cap. The container may be made of a flexible plastic and/or Mylar sufficient to allow a collapsing or squeezing force on the container body to force fluid through the filter and upward through the extendable hollow tube. The container's straw may also assist in forcing liquid through the filter and upward to the user's mouth.

In a third aspect, the present invention is directed to a filtering container comprising: a container body having a first end having a top opening and a second end opposite the first end; a container cap having an influent interface with a complementary connector at a fluid source, the container cap including a filter media and a one-way valve to allow filtered water to enter the container body, the container cap sealingly engageable with the first end opening of the container body; the filter media within the container cap adapted to filter ingress fluid upon entry into the container body, the filter media purifying a fluid passing therethrough, and wherein the fluid in the container body is drawn first through the filter upon entry.

In a fourth aspect, the present invention is directed to a liquid filtering container comprising: a dual bag construction including a first fluid-tight bag portion for containing unfiltered liquid and a second bag portion for containing filtered liquid, the first fluid-tight bag portion in fluid communication with the second bag portion including a filter assembly which includes a filter media, an egress port allowing fluid to flow from the first fluid-tight bag portion to the second bag portion, and may also include a one-way valve, be fluid-tight and/or be constructed in a non-collapsible format such that the fluid from the second fluid-tight bag portion (filtered fluid) cannot flow back into the first fluid-tight bag portion; wherein, the first fluid-tight bag may be collapsible in order to push unfiltered liquid through a filter to the second fluid-tight bag, which can also be assisted by suction from the outside of the second fluid-tight bag by way of a straw or mouthpiece.

The liquid filtering container may include a break-away cap in a separate compartment within the container, including a cap connector attachable to a liquid source, allowing the container to be filled from the source.

In a fifth aspect, the present invention is directed to a liquid filtering container comprising: a collapsible bag construction including a fluid-tight bag portion for containing unfiltered liquid; a sealable ingress port; a filter assembly in fluid communication with fluid in the collapsible bag including a filter media, an aperture allowing the unfiltered fluid to flow from the fluid-tight bag portion through the second fluid bag constructed of filter media to an egress port located opposite the filter media, when the collapsible bag is compressed; and an egress port enabling a user to obtain filtered liquid from the liquid filtering container upon compression and/or suction.

The sealable ingress port may be a fold-over sealable top for one-time use or have a closure that can be re-opened for multi-use of the filter bag.

The sealable ingress port may include a sealable wide mouth opening on the collapsible bag that may not be re-usable once closed or may be re-opened and closed for multi-use applications.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is an exploded view of the filtering container according to the present invention;

FIG. 2 is a perspective view of the filtering container shown in FIG. 1;

FIG. 3 is a side elevational view of the filtering container shown in FIG. 1;

FIG. 4 is a top elevational view of the filtering container shown in FIG. 1;

DESCRIPTION OF THE PREFERRED EMBODIMENT(S)

Figure 5:
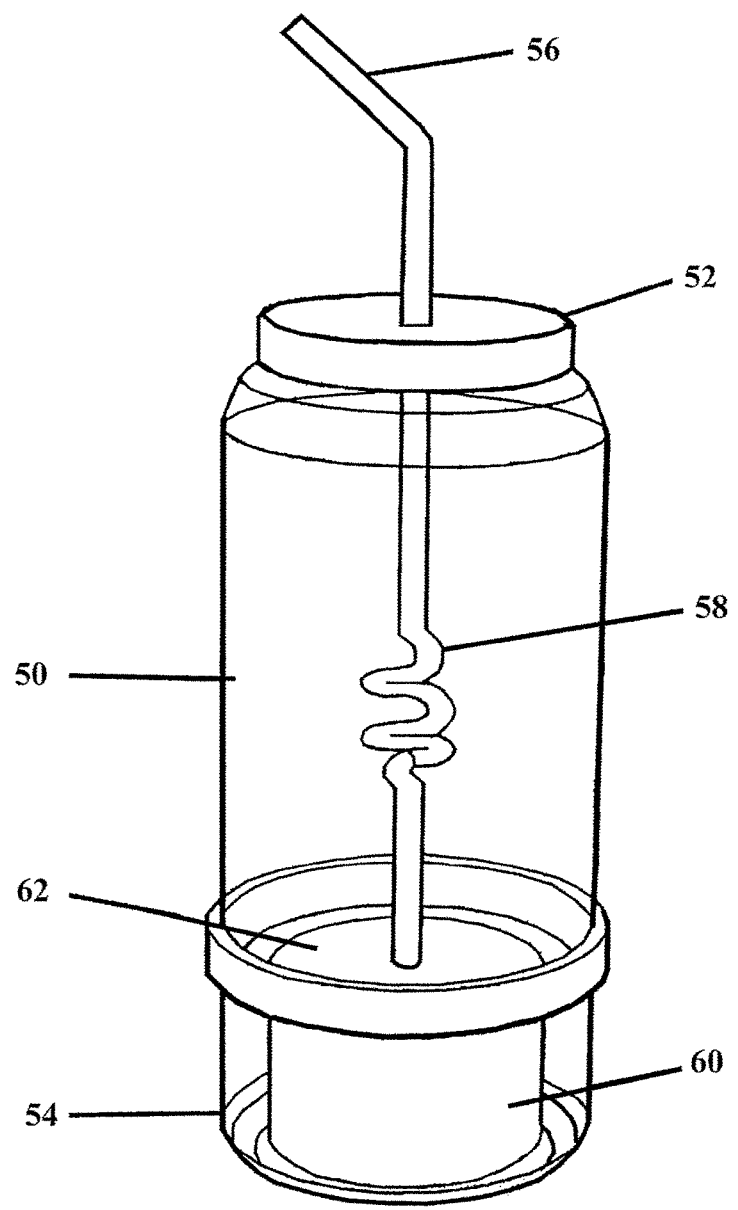
FIG. 5 is a perspective view of a filtering container having a elongated tubular mouthpiece.

Currently home filtration systems are used to filter a certain volume of water and include such embodiments as refrigerator pitchers, countertop systems, under the counter systems, and faucet-based systems. They are routinely used to provide home potable water. Some users fill sports and other types of reusable bottles from these sources as a replacement for store-bought bottled water.

The novel features of a preferred embodiment of the present invention may include a collapsible bag or compressible bottle container for accepting and holding liquid. The liquid may be filtered upon entry to the container, or it can be placed and stored in the bottle in an unfiltered state and filtered upon egress. The filtering container may be a collapsible bag, preferably a collapsible, compressible material, such as a soft plastic or Mylar bag construction, as exemplified currently in the market, for example, by pouches sold by Gatorade®. Such bottles or bags are collapsible, easy to use and contain a fraction of the material of an equivalent sized disposable bottle.

In the present invention, filter media is installed either on the bottom of the bottle or bag, or within the top cap of the bottle or bag, or in a configuration where the filter is able to move up and down within a container. Alternatively, the present invention may include a sealed bag-within-a-bag construction, such that when filling, a small volume of air could be pumped into the outside compartment which would give the bottle or bag enhanced rigidity and thermal insulating advantages, allowing the otherwise collapsible container to stand upright even when liquid is not present, and also to act as an insulator for the liquid. There may also be other ridged components used to hold the filter component in the collapsible embodiment that will also add to its rigidity without producing excessive bulk.

Another embodiment of the filtration system includes a single use filter. Incorporating the filter media within the container would also help with recycling, in that the system would be maintained as a single unit. Initial testing of filter media has been successfully performed with FACT® media of KX Technologies, LLC, of West Haven, Conn., but the system is also capable of using molded or extruded carbon block, or GAC, as its filter media, and other filter media and membranes of like construction.

An embodiment of the present invention includes a single use liquid container having filter media built in, or attached thereto, and in some instances depending upon the protection warranted, may further include a construction to limit multiple uses to ensure filtration quality. The filter media may be disposed in the sealing cap, typically located at the top of the container, or alternately positioned near the bottom or center of the container. Employing a cap which includes the filter media may allow the body of the container to be re-used; the user replacing the cap and filter media combination after each use. If the filter is in the bottom of the container, the filter could be temporarily removed and the container could be cleaned after each use. In a configuration employing a collapsible pouch style bags, the filter would preferably be permanently affixed to the bag and likely is a single use device, although a multi-use container is also envisioned. The bag filter would also reduce the total amount of plastic and other materials used, reduce the weight of containers, and reduce total volume needed per case of containers for shipping, for example, to remote or decimated areas of natural disaster. These packaged containers or cases of containers could be transported very easily, and later filled at the destination, for example, in homes, in a river, or anywhere where the integrity of the potable water is questioned.

The filtering containers may be attachable by a connector to a faucet, a countertop unit, or a refrigerator, and filled at home with tap water. The filter media located in a cap or at the bottom or side of the container would filter the water per its inherent filter specifications, ensuring the desired quality of water. The empty containers may be compressed, packaged, and stored at home, and filled when they are needed.

Optionally, an air space may be added between the outside of the container in the form of an air-tight outer bag layer, thus forming a filter bag within a bag. When being filled, water would be forced through the filter into the inside bag converting fresh pure water from the tap, and the outside bag could be slightly pressurized with air which would give the container rigidity and act as an insulator for the liquid.

A first embodiment of a filtering container is shown in FIGS. 1-4. The filtering container allows the user to draw exclusively from the effluent (or clean) side of the filter. In this manner, the user can only access fluid drawn through the filter and completely isolated from contamination. A variety of filter media may be used as needed, depending on the filtration required for specific applications. For example, a microbiological filter may be used for removing bacteria, cysts, and/or viruses; a carbon filter may be used for removing chlorine or organic contamination; a particle filter may be used for removing silica, precipitated iron or rust, dirt, or any particles greater than the micron rating of the filter, to name a few. Filter media such as FACT® media from KX Technologies, LLC, is appropriately useful for this type of filtration delivery system. Preferably, the filtering container would employ KX Technologies' NANOTEKX™ nanofiber filtration material in a pleated filter design to minimize pressure drop. Different filters with different media could be used depending on the user's needs for specific level of filtration.

In one embodiment, the filtering container is designed to ensure that the effluent remains contamination free especially during filter replacement and when replenishing the liquid. The present invention facilitates keeping the effluent side uncontaminated while promoting easy change out of the filter.

In a first embodiment, the filtering container 10 according to the present invention comprises a container cap 12 with mouth piece 14 as depicted in FIG. 1. The container cap may also include a one way air valve (not shown) to allow air back into the bottle during use and promote efficient liquid egress. Mouthpiece 14 may be integral with container cap 12, or sealably attached thereto. FIG. 4 depicts a top view of container cap 12 with center mouthpiece 14. The filtering container includes a liquid transfer tube 16, preferably cylindrical, in the manner of a straw, sealed or sealably attached to the underside of container cap 12. The attachment scheme may be in various forms, and is not limited to any particular scheme, provided that the attachment is sealable during use, and will not leak. For example, the container cap underside may include an extension piece, preferably cylindrical for a cylindrical liquid transfer tube, for inserting within and sealably securing the top end of liquid transfer tube 16. Liquid transfer tube 16 may have any alternative cross-section, and the extension piece extending below the container cap underside may be of an accommodating cross-sectional shape to sealably secure the liquid transfer tube to the container cap underside. A friction fit seal may be adequate, or the junction between liquid transfer tube 16 and the underside of container cap 12 may be cemented or thermo-welded. Liquid transfer tube 16 may also be integral with the underside of container cap 12. Other methods of attachment commensurate with the material used for the liquid transfer tube and the container cap underside may be employed provided the attachment is secured in a liquid-tight fashion.

Conversely, the container cap underside may include a recessed portion or indentation, preferably cylindrical in nature for receiving and securing the top end of a cylindrically cross-sectioned liquid transfer tube, although other cross-sectional shapes are not excluded, and may be employed provided the liquid transfer tube can be sealably attached to the container cap underside.

Liquid transfer tube 16 preferably includes a flexible portion 18, and extendable to a length that allows the tube to lengthen beyond the filtering container body 20 while remaining in sealable contact with the container cap underside when container cap 12 is removed, so that the connection between liquid transfer tube 16 and container cap 12 need not be severed during cap removal. This construction prohibits contaminated fluid from entering liquid transfer tube 16. Flexible portion 18 may be an elastic portion that allows liquid transfer tube 16 to stretch and extend beyond and outside the filtering container body 20. Alternatively, flexible portion 18 may include a spring or helical shaped portion, which is sufficiently flexible to elongate when container cap 12 is removed from the filtering container body 20. Liquid transfer tube 16 need not be permanently sealed to the container cap underside, and may instead be removably attached to container cap 12.

As shown in FIG. 1, filtering container 10 includes a filter end cap 22 that sealably connects to the end of liquid transfer tube 16 opposite the end attached to the container cap underside. The connection between filter end cap 22 and liquid transfer tube 16 may be in a similar fashion to that described for the sealable connection at the container cap underside, or any acceptable sealable, leak proof alternative. Upon removal of container cap 12, the connection between filter end cap 22 and liquid transfer tube 16 preferably remains in contact as well. The extension of liquid transfer tube 16 should be sufficient to allow for the removal of container cap 12 without severing the connection between filter end cap 22 and liquid transfer tube 16.

Filtering container 10 includes body portion 20 that sealably connects to a filter housing assembly 24. Filter housing assembly 24 includes a filter housing 26 which forms the bottom portion of filter container 10, and houses filter media 28. Filter media 28 is preferably sealably connected to the underside of filter end cap 22. Filter housing 26 encases filter media 28. As depicted in FIG. 1, filter housing 26 includes a plurality of indentations or radially inwards protrusions 30 extending at least partially circumferentially within filter housing 26 to center filter media 28 therein and provide longitudinal or axial gaps for fluid ingress to the filter media. Other means of centering filter media 28 within filter housing 26 may be employed so long as the sides of filter media 28 are exposed to unfiltered liquid, which may then be drawn radially through filter media 28 and up liquid transfer tube 16.

As depicted in FIG. 2, upon assembly of filter housing assembly 24 to filtering container body 20, an annular gap 40 will present to the fluid at the lower end of the filtering container where filter end cap 22 is located. The annular gap is formed between filter end cap 22 and the filtering container lower portion. The outer diameters of filter end cap 22 and the correspondingly attached filter media 28 are less than the inner diameter of the filtering container lower portion at the attachment point. Upon user activation, either by drawing fluid up liquid transfer tube 16 by suction, or collapsing the compressible filtering container body 20, unfiltered fluid will forcibly enter annular gap 40 and travel radially through filter media 28, and ultimately filtered fluid will be drawn up liquid transfer tube 16 towards mouthpiece 14.

As depicted in FIG. 3, filtering container body 20 may include external sides 42 that are textured to facilitate gripping, and flexibly compressible to facilitate extraction of liquid from liquid transfer tube 16. Filtering container body 20 may be squeezed or the user could orally siphon the liquid through liquid transfer tube 16, or both. Filter housing 26 is preferably threadedly attached to filtering container body 20 at the lower end opposite the end having container cap 12. Filter housing assembly 24 is removable for filter replacement. Filter media 28 may be securably attached to filter housing 26, or removably secured.

Filtering container 10 is easy to use, flexible, and versatile. Liquid transfer tube 16, which is preferably located in the center of the filtering container body 20, and sealably attached at both ends, allows a user carefully to submerge filtering container body 20 in unfiltered liquid for filling, when container cap 12 is removed and liquid transfer tube 16 is extended, without risking contamination on the effluent side. The center of mass of filtering container 10 when properly assembled is found closer to the heavier filter housing assembly 24, which has filter media 28 enclosed. In this manner, the bottom-heavy filter assembly provides a more stable container for placement and standing upright on a flat horizontal surface.

To remove filter housing assembly 24 when filter housing 26 is threadedly secured to filtering container body 20, filter housing assembly 24 is rotated with respect to filtering container body 20 so that filter housing 26 unscrews from filtering container body 20. If a liquid-tight snap or press fit is established between filter housing 26 and the filtering container body 20, the removal will require defeating the snap or press fit attachment scheme, which is preferably performable without tools. Filter housing assembly 24 may be removed from the filtering container body 20 while filter end cap 22 remains attached to the liquid transfer tube. In this manner, liquid transfer tube 16 remains sealably attached to the effluent port of filter media 28. To replace filter media 28, filter housing assembly 24 is detached from liquid transfer tube 16 filter end cap 22, and either a new filter housing assembly 24 is presented, or filter media 28 and filter end cap 22 are replaced. Filter housing assembly 24 is then reattached to filtering container body 20.

The flexible, elongated liquid transfer tube 16 is designed so that flexible portion 18 of the tube may move longitudinally with respect to the lower portion of the tube. Flexible portion 18 may be a corkscrew configuration to allow extension or contraction of liquid transfer tube 16. Flexible portion 18 of liquid transfer tube 16 also allows the upper end of the tube to move with the removal of container cap 12 so that the upper tube portion end may protrude outwardly further from filtering container body 20, and move inwardly to collapse tube 16 further into filtering container body 20 upon reassembly. Flexible portion 18 also makes liquid transfer tube 16 less rigid so that the tube is less likely to poke or stab the user upon application.

FIG. 5 depicts a second embodiment of the present invention. In this embodiment, filter housing 54 is threadedly secured to filtering container body 50. Container cap 52 is also a threadedly securable cap, with an effluent mouthpiece 56 in the shape of a common straw. Mouthpiece 56 may be releasably attachable to container cap 52, or integrally formed therewith. Mouthpiece 56 may also be a one-piece construction with liquid transfer tube 58 that traverses through an aperture in container cap 52. Mouthpiece 56 may be secured compression seal within the aperture, and made liquid-tight by means of an O-ring, or like design. Filter housing 24 is shown encasing filter media 60, which is centered about filter housing 24, and allows for an annular gap between the inner diameter of filtering container body 50 and filter media 60 and its associated end cap 62. The connection of liquid transfer tube 58 at end cap 62 is preferably by quick-release attachment, provided such attachment is liquid tight.

Figure 6:
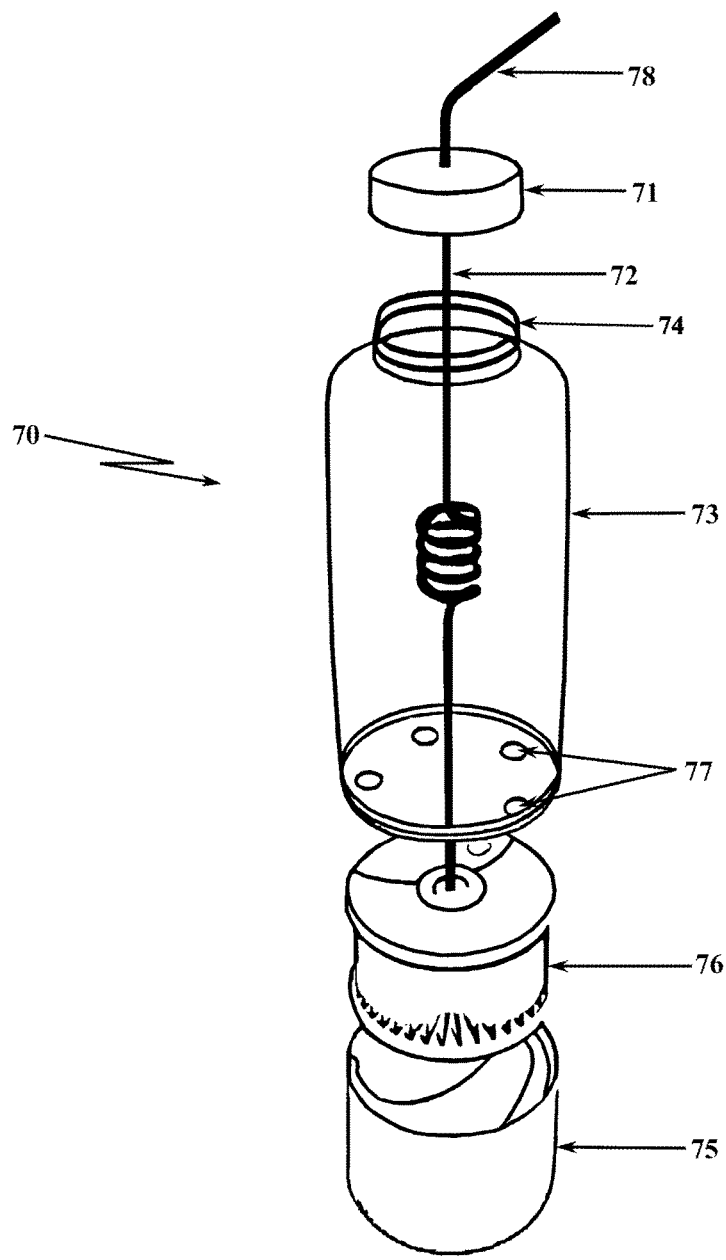
FIG. 6 is perspective view of a second embodiment of the present invention.

In another embodiment of the present invention as shown in the exploded view of FIG. 6, the filtering container 70 includes a container body 73 having a screw top opening 74 at an upper end. Screw top opening 74 includes external threads engageable with a cap 71 having internal threads. Filtering container 70 includes a bottom housing cover 75 enclosing a filter media 76. The container body 73 has at least one aperture 77, and preferably a plurality of apertures, on its bottom to allow a fluid in the bottle to pass from container body 73 to filter media 76. Filter media 76 purifies the fluid flowing therethrough and the fluid then passes into an attached liquid transfer tubing or straw 72. Mouthpiece 78 is preferably in the shape of a straw; however, other mouthpiece configurations are acceptable and may be preferred depending upon the particular nature of use of the filtering container. Liquid transfer tubing 22 extends from the effluent side of filter media 76, through one of container body 73 apertures 77, preferably a center aperture, into container body 73 and through an opening in cap 71. Cap 71 is sealable with liquid transfer tubing 72. Bottom housing cover 75 enclosing filter media 76 is sealingly engaged with the lower end of container body 73. Bottom housing cover 75 may include internal threads engagable with external threads on the lower threaded portion of container body 73 or may include an internal lip engagable with an external lip on the lower portion of container body 73 for a snap or compression fit.

Figure 7:
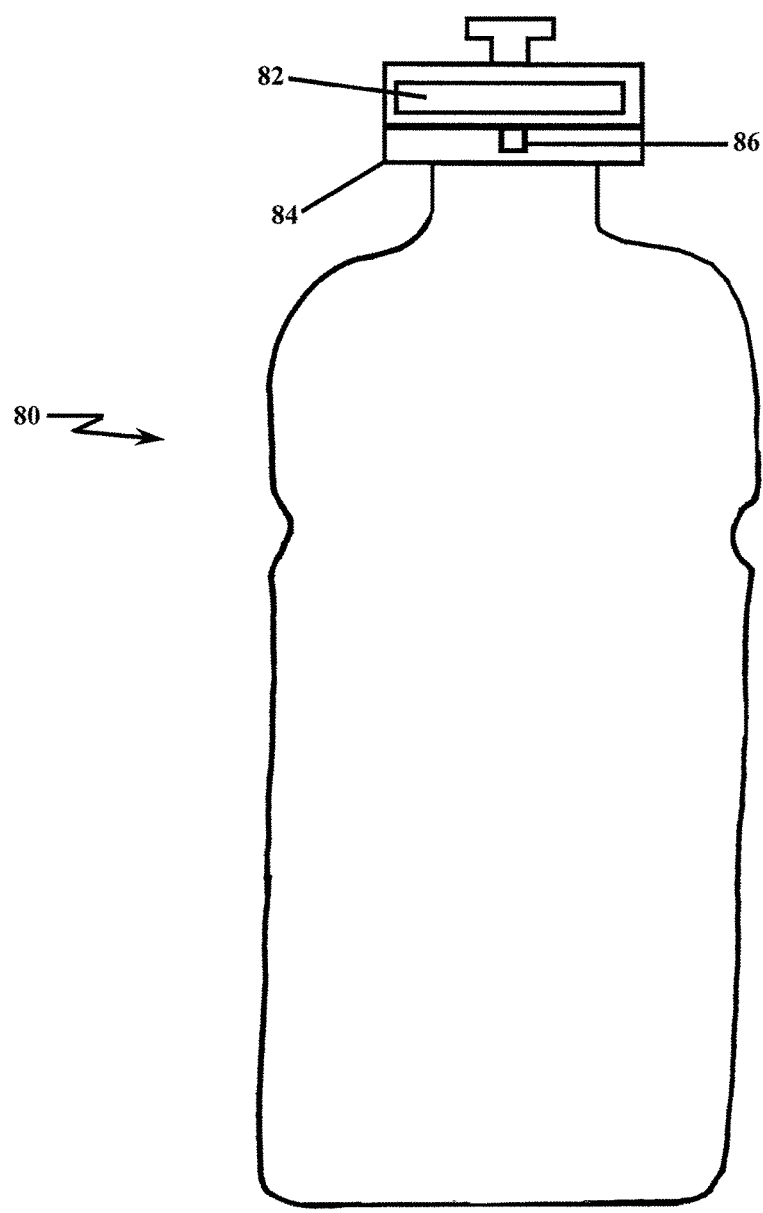
FIG. 7 is a cross-sectional view of a third embodiment of the present invention where the filter media resides in the container cap.

In another embodiment of the present invention shown in FIG. 7, a water bottle includes a single use purifying filter. The purifying filter may alternately be a multi-use filter. The bottle body is preferably collapsible, and may, for example, use a collapsible aluminum Mylar material as a bottle. The filter is preferably located within the removable cap. The fluid may be filtered upon ingress into the bottle, or conversely, may be filtered upon egress. The liquid is filtered when it enters the bottle or, conversely, the filtering assembly may filter the water when it leaves the bottle. The latter, although feasible, is a less desirable solution since the user is carrying unfiltered water in the bottle or bag that could continue to grow bacteria and virus.

It is envisioned that the filtering container most likely will be filled from a potable water tap or other water source, including, but not limited to, a stream. Other atypical potable water sources are not prohibited—the limitation being the level of filtration available by the filter assembly, and whether this filtration is sufficiently adequate and safe for the particular water source. The filtering container may be capped with a variety of cap assemblies that could contain filtering materials within the cap itself The filtering materials would remove certain contaminants such as, but not limited to, taste and odor, bacteria, viruses, organic matter, chlorine, monochloramines, silt, sand, heavy metals, organic materials and the like, upon ingress, or conversely, upon egress if the filtering cap is placed on the egress port. A filtering cap assembly would facilitate use of the container as a drinking device, allowing water to pour out of the bottle, or be squeezed out, while providing a seal closure between uses.

An embodiment of a filtering container 80 is depicted in FIG. 7, where filter media 82 is located in an influent cap 84. Filtering container 80 may be filled through the filter-cap assembly 82, 84 where filter media 82 would act on and filter the incoming fluid, presumably water, but other liquids are not prohibited, provided the interaction with the filter media does not adversely affect the liquid, before the liquid enters filtering container 80 so that the contaminants are removed upon initial filling, and filtering container 80 contains and stores filtered water. Filtering container 80 may be a bottle or bag configuration. It may also include the filtering assembly in a break-away cap initially in a separate compartment within the container. Cap 84 may include a one-way valve 86 to ensure contaminated fluid remains truly separate from filtered fluid. The break-away cap may include a cap connector attachable to the liquid source, allowing the filtering container to be filled from the source, provided the source has a compatible connector for the break-away cap connection. This connection would allow the liquid pressure provided by the liquid source, such as a sink tap with an adaptor to fill the bottle or bag, or from an array of other similarly fitted devices from a refrigerator dispenser, a countertop device, or a hand pump with a connection to fit the filtering container cap. The cap or source connector may include a seal for providing a resistance to leaks due to liquid pressure supplied by a liquid source.

Figure 8:
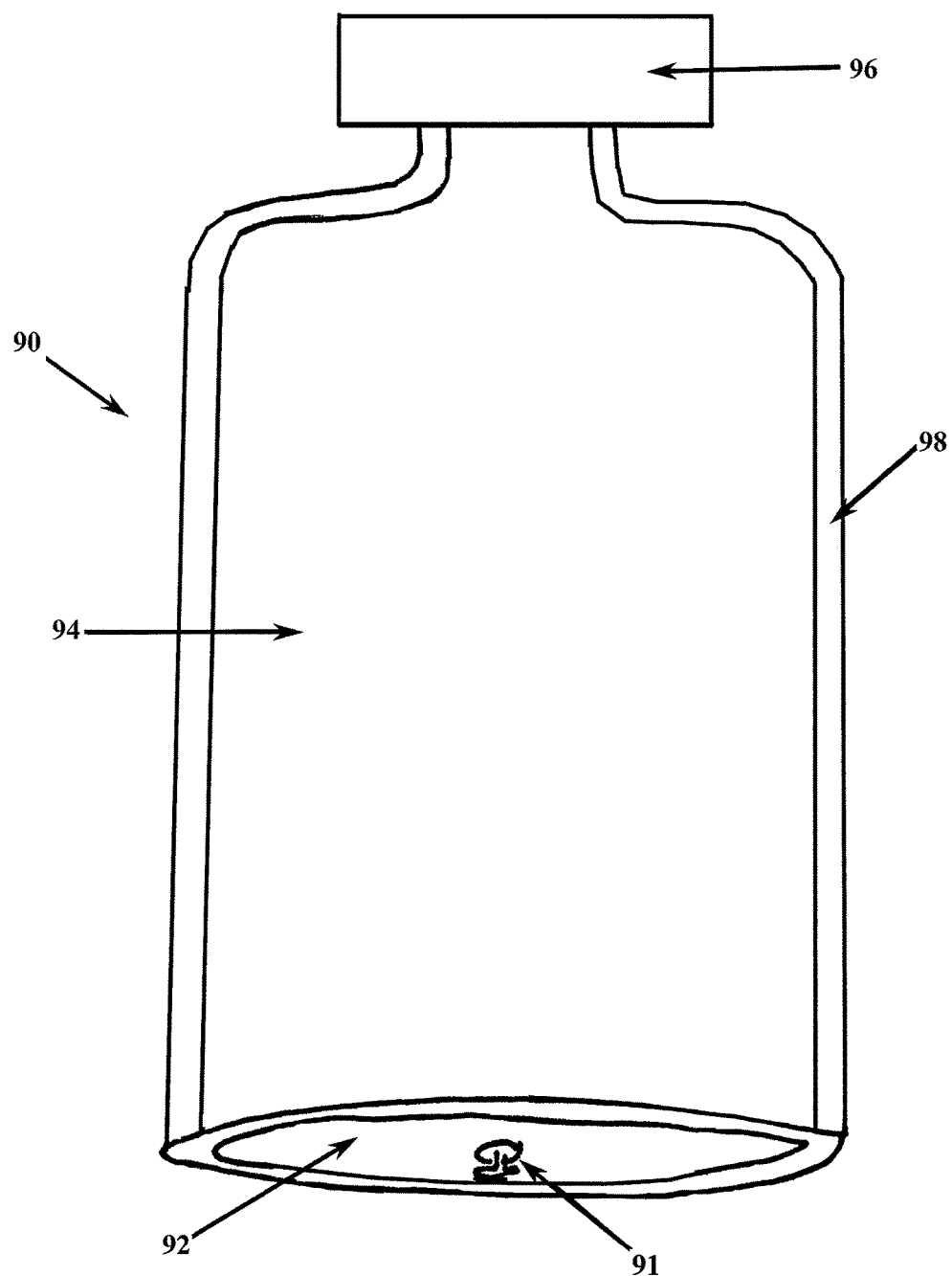
FIG. 8 is a cross-sectional view of a filtering bottle or bag including a break-away ingress connector.

Another approach, depicted in FIG. 8, is a filtering container 90 which incorporates a filter assembly 92 at an end opposite a removable cap 96. Filter assembly 92 preferably incorporates a flat filter media, such as FACT® technology media from KX Technologies, LLC. Compartment 94 is filled from a connector 91 located adjacent filter assembly 92. Connector 91 is preferably a one-way valve connection that receives influent liquid from an external source (not shown). As a bag construction, filtering container 90 would be significantly easier to carry, and large numbers of these filtering containers could be efficiently packaged in bulk. The filters could be varied to give different levels of filtration for different requirements and needs. This allows for quick utilization in disaster situations such as floods, tsunamis, or earthquakes, for example, where water is available, but is of questionable quality. In this manner, significant amounts of safe potable water may be made available to dispersed people in a disaster area.

The filtering container could also include flavors and/or taste enhancers that are either included into the bag, in a separate protective pouch within the bag, or placed into the filter area where they are released into the bag when water traverses through the filter. The flavor enhancer may be a dissolvable coating, a powdered, liquid, or gel material containing a flavor for mixing with the fluid. The filtering container may also include a food grade foil pouch. An optional airtight outside layer bag construction 98 may be employed to receive forced air that would lend insulation and rigidity to filtering container 90.

Figure 9:
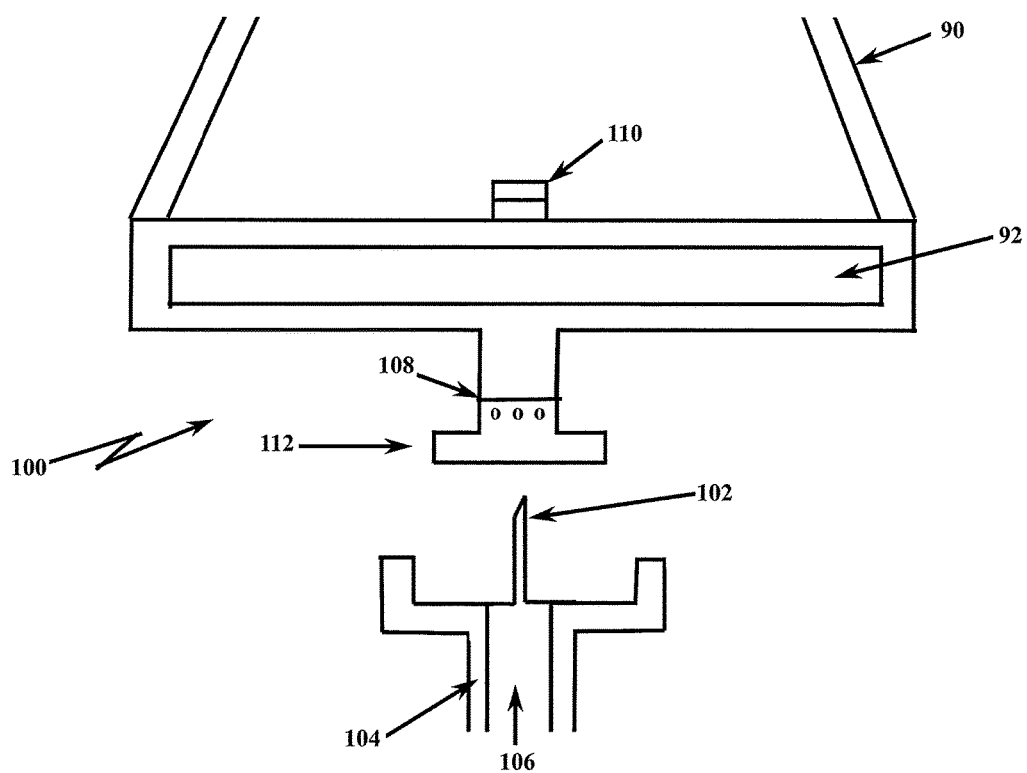
FIG. 9 depicts a filling needle for the filter bottle or bag of the present invention presented with the fluid ingress mating connector on the fluid source side.

In general, a single-use attachment mechanism 100 may be employed to limit the use of the filtering container bottle/bag construction design. One such attachment mechanism is depicted in FIG. 9 where a filling needle 102 is presented with a fluid ingress mating connector 104 on the fluid source side where influent water 106 enters. Needle 102 would puncture a thin film 108 in the ingress mating connector 112 on the filtering container 90. Inside filtering container 90, a one way valve 110 receives the fluid, but does not allow the fluid to exit through the same connector. In this embodiment, filter media 92 is a preferably a flat sheet media, although other filter media types are not prohibited. In one embodiment, filling needle 102 punctures thin film 108 in a manner that prohibits further use by filtering container 90.

Figure 10:
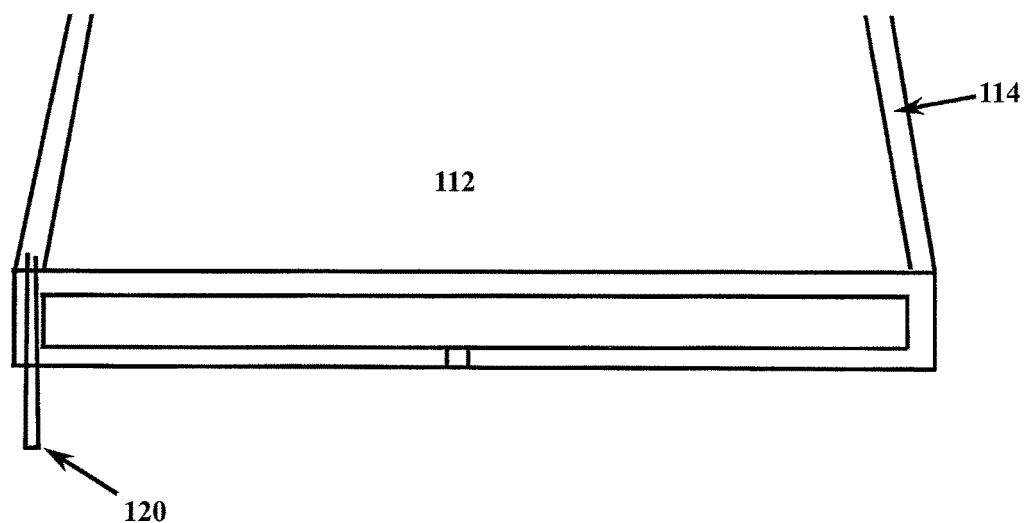
FIG. 10 depicts a partial cross-sectional view of a filter bag having a second compartment for retaining compressed air, with a valve accessible at either the top or bottom portion of the container body.

As described above, in some embodiments the filtering container bottle or bag includes an outer layer to entrap air between the outermost surface of the bottle or bag and the internal compartment or body that holds the fluid. The trapped air layer provides insulation and rigidity to the otherwise collapsible bottle body. FIG. 10 depicts an exploded view of a filtering container bag 112 with an outside layer 114, an air valve 120 may be present and accessible at either the top or bottom portion of filtering container 112 to trap air within layer 114.

Figure 11:
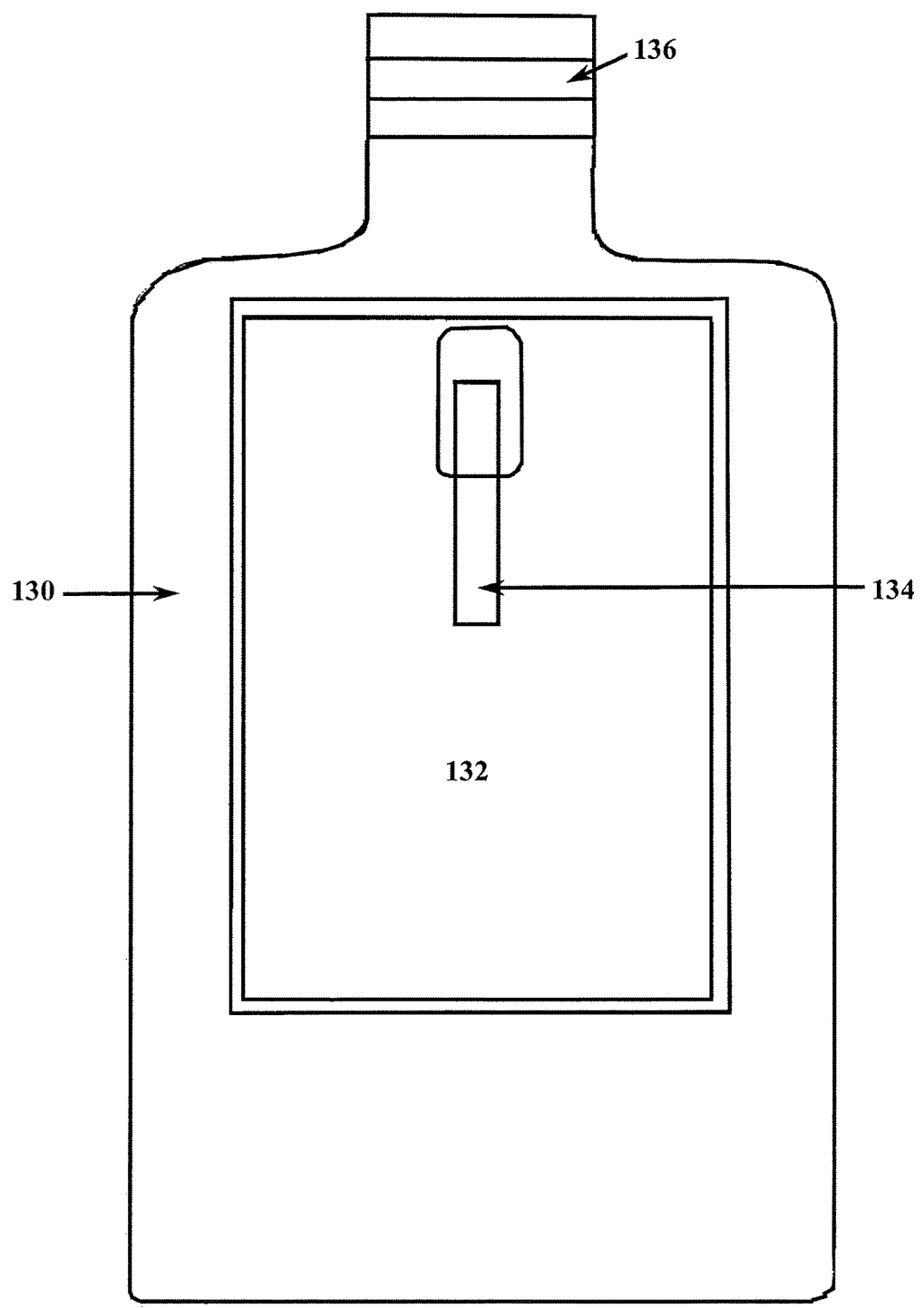
FIG. 11 is a cross-sectional view of a collapsible bag with a substantially flat integrated filter.

FIG. 11 depicts another embodiment of a collapsible bag 130 with an integrated filter 132. Filter 132 is preferably a flat sheet media attachably sealed to bag 130 and in fluid communication with the liquid contents of bag 130, such that compression of the bag forces liquid through filter 132 and through a mouthpiece egress 134. In this embodiment, collapsible bag 130 has a fold-over sealing top 136, which may be a one-time permanent closure, but removably attachable seals are also envisioned.

Unfiltered liquid remains in collapsible bag 130 until it is forced either by compression or suction through flat filter media 132 and out mouthpiece 134. Flat filter media 132 may be enclosed within its own "filtered liquid" envelope, where some filtered liquid may reside before it is forced under pressure to exit. The collapsible bag may be a Mylar, plastic, or any suitable material capable of collapsing without permanent degradation to the integrity of the liquid-tight seal.

Figure 12:
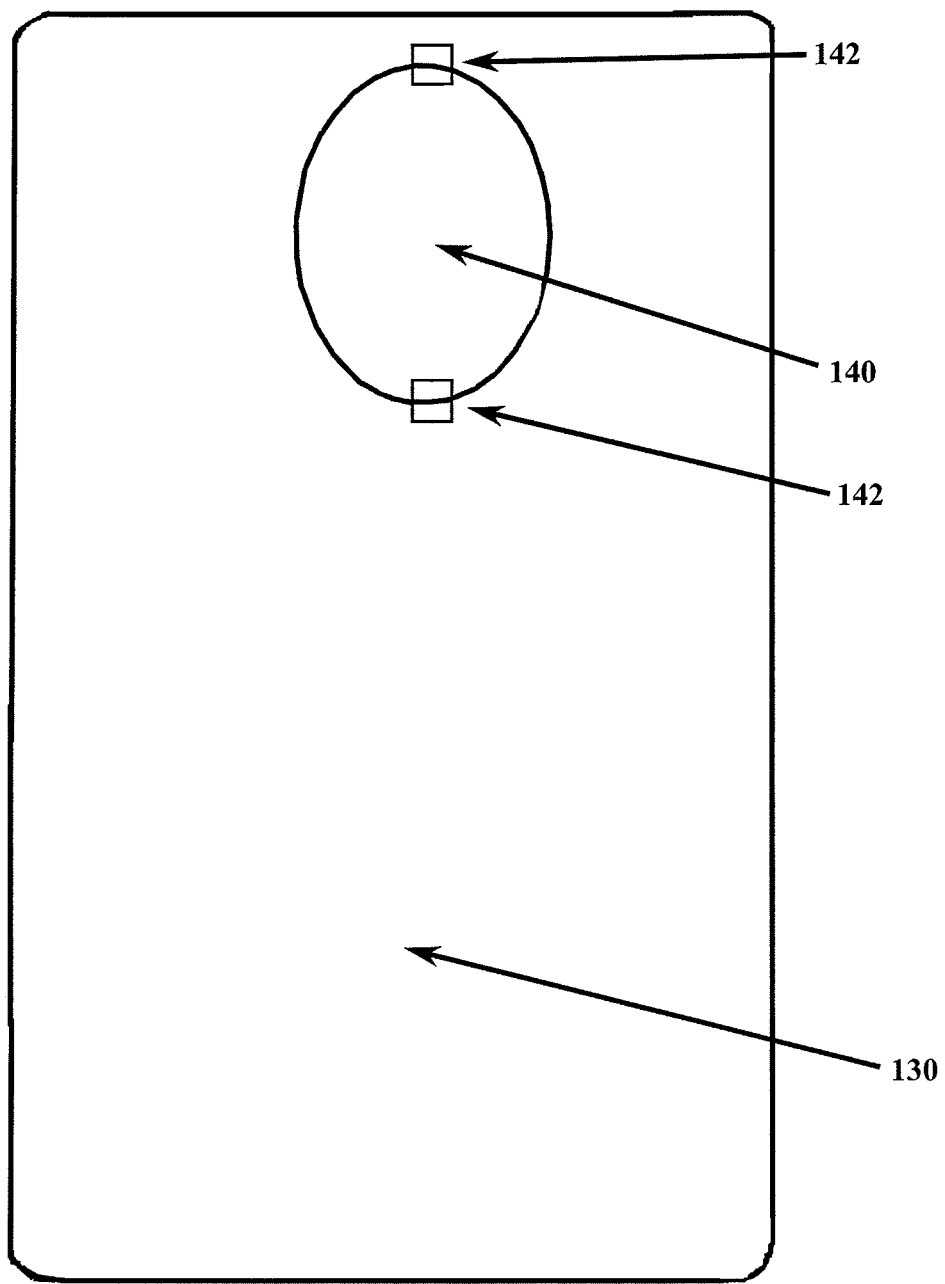
FIG. 12 is a cross-sectional view of the collapsible bag of FIG. 11 with an ingress port on the container body backside.

FIG. 12 depicts another version of the collapsible bag of FIG. 11. The filling port or ingress port 140 is preferably located on the backside of collapsible bag 130, but may be in another position, and preferably is a one-time use port, which cannot be re-opened. The collapsible bag would retain a flat filter media and straw egress of the type demonstrated in FIG. 11. Filling port 140 is preferably a wide mouth port with a molded one-time closure construction. Depicted in FIG. 12 is a hinged filling port, having molded hinges 142.

Figure 13A:
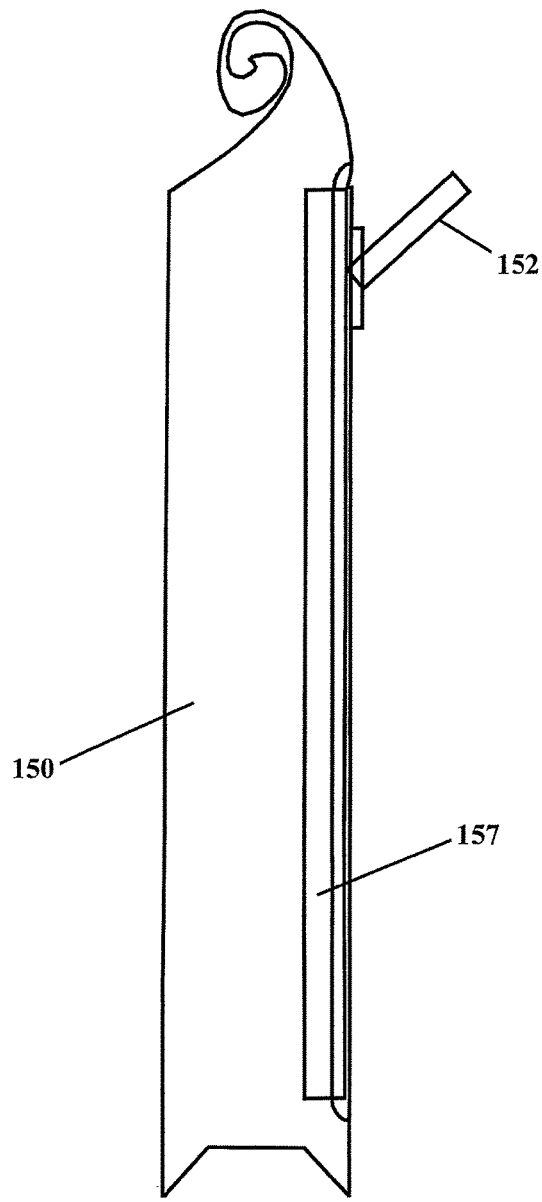
FIG. 13A depicts a movable mouthpiece for fluid egress that is used to draw fluid from a filter media and the filter media is sealed to the side of the collapsible bag.
Figure 13B:
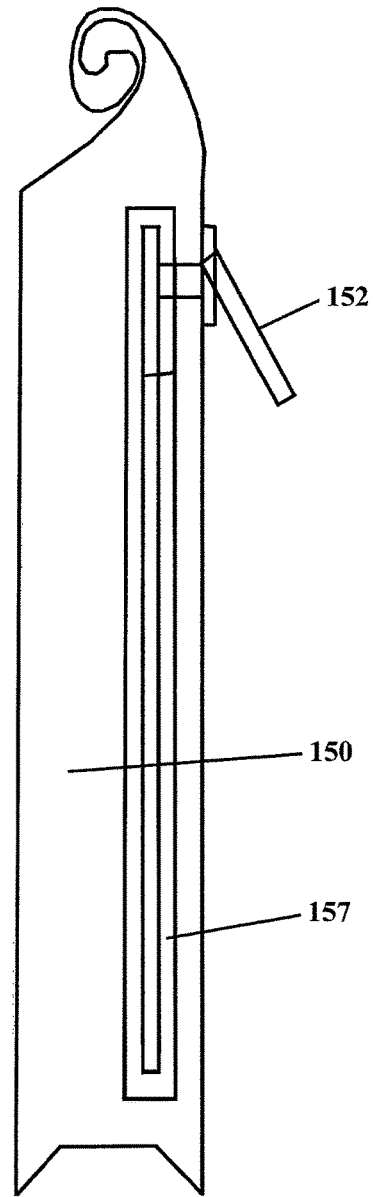
FIG. 13B depicts a collapsible bag with a movable mouthpiece directed towards a closed position, with a filter media formed into its own envelope and connected to the mouthpiece.

FIG. 13 depicts a side view of a collapsible bag construction 150 filtering container of the present invention. FIG. 13A depicts a movable mouthpiece 152 for fluid egress that is used to draw fluid from a filter media 157. Filter media 154 is preferably a flat sheet media, such as FACT® media from KX Technologies, LLC. Filter media 157 is sealed to the side of collapsible bag 150, in a manner similar to the attachment of a sealed envelope to a box. FIG. 13B depicts collapsible bag 150 with mouthpiece 152 directed towards a closed position. In a closed position, mouthpiece 152 seals such that leakage is prohibited. Filter media 157 is formed into its own envelope and connected to mouthpiece 152 or similar structure. The collapsible bag construction 150 is depicted as a foldable, sealing construction; however, other constructions are not prohibited, such as removably, sealable caps, friction fit seals, and the like.

Figure 14:
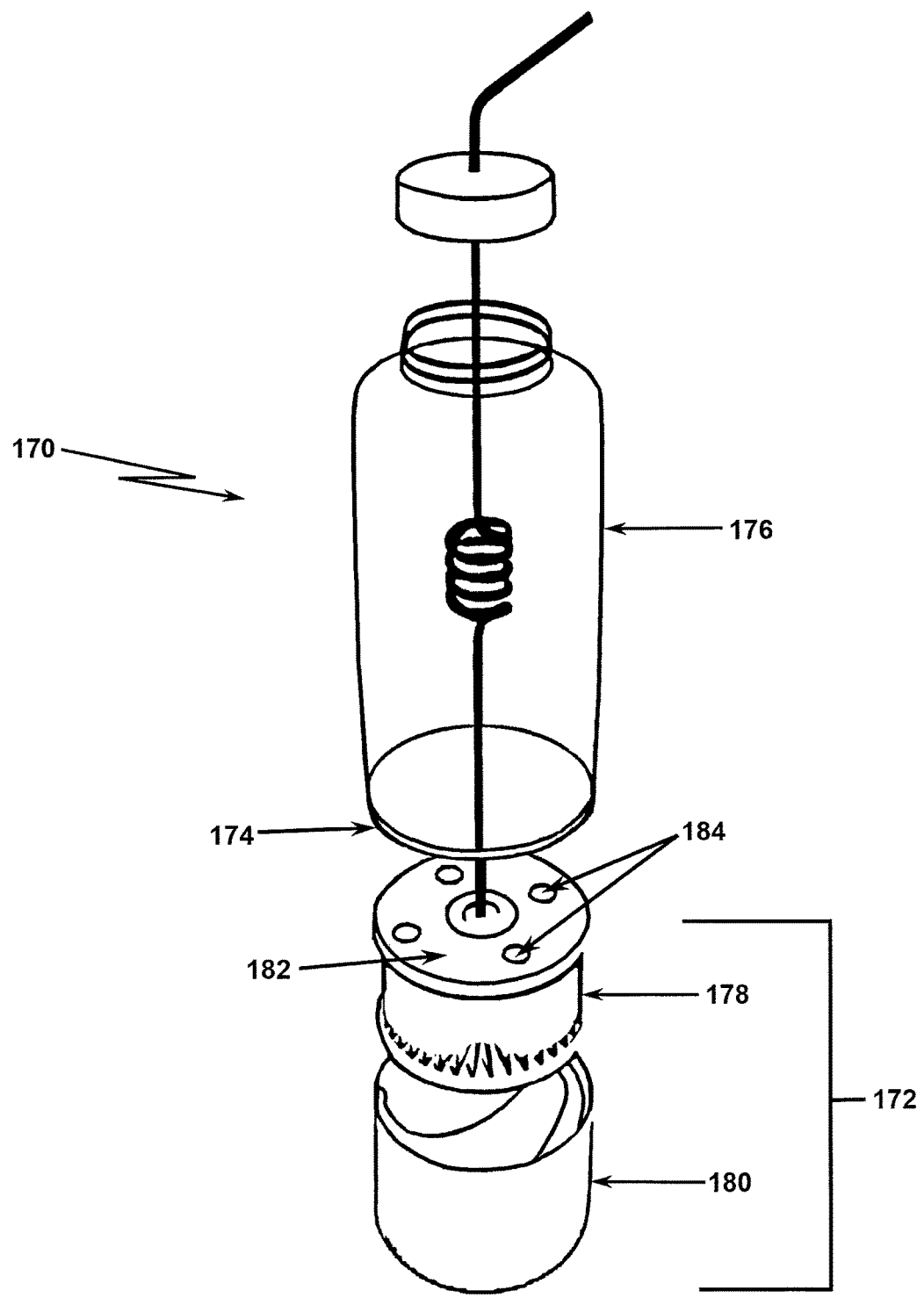
FIG. 14 depicts a filtering container with filter media having an end cap with apertures for allowing fluid to traverse through the media from the top of the filter media.

FIG. 14 depicts a filtering container 170 wherein the filter housing assembly 172 is removably attached to the bottom portion 174 of the filter bottle 176. Filter media 178 includes an end cap 182 with apertures 184 for receiving fluid from filter bottle 176. In this manner, filter media 178 may have a radius that extends to the inner diameter of filter housing 180, and filter media 178 receives fluid in a longitudinal direction from filter bottle 176 through apertures 184.

Figure 15:
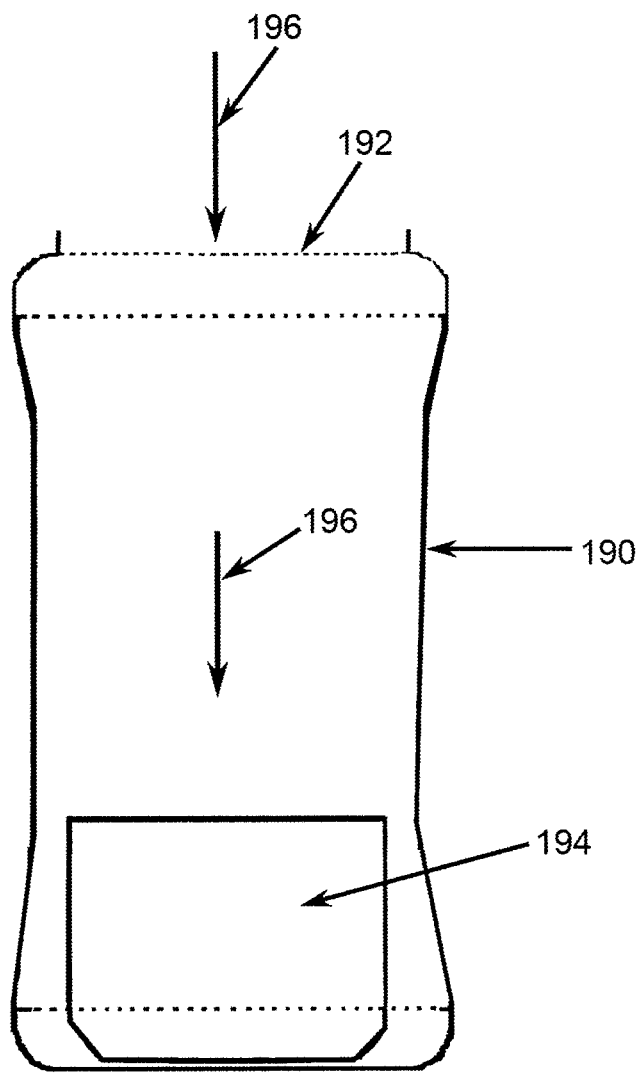
FIG. 15 depicts a filtering container with one opening wherein the filter housing is placed within the filtering container from the one opening.

FIG. 15 depicts a filtering container 190 having a single opening into which filter media 194 is placed, as shown in the direction of arrows 196. Filter media 194 may be secured in housing 190, or loosely fit. An egress tube, such as a straw (not shown) would provide for fluid egress from filter media 194, preferably center-placed to draw fluid radially through filter media 194.

Thus, having described the invention, what is claimed is:
1. A filtering container comprising:
    a container body having a first end and a second end opposite the first end;
    a container cap having a container cap aperture extending therethrough and a mouthpiece in fluid communication with the container cap aperture, the container cap removably and sealingly engageable with the first end of the container body;
    a filter housing engageable with the second end of the container body, said filter housing having a hollow inner portion for receiving a filter media;
    a filter end cap having an a single end cap aperture and attachable to the filter media, said filter end cap having an outer diameter that is less than an outer diameter of said container body second end, such that an annular gap is formed for liquid ingress from said annular gap to said filter media, and not through said filter end cap; and
    a hollow tube sealably connected at a first end to the end cap aperture and sealably connected at an opposite second end to the container cap aperture, said hollow tube extending from the end cap aperture to the container cap aperture;
    wherein the filter housing is engageable with the filter media, the filter media adapted to purify a fluid passing therethrough when the filtering container is in an upright orientation, and wherein a first end of said hollow tube is in fluid communication with egress fluid from said filter media, such that fluid contained in the container body is drawable radially through the filter media, and exits the filter media through the end cap aperture to the hollow tube.
2. The filtering container of claim 1 wherein the hollow tube includes a flexible, extendable portion intermediate the hollow tube first and second ends and within said container body extendable to a length that allows the hollow tube to lengthen beyond the filtering container body.
3. The filtering container of claim 1 wherein the filter media is removably attached to the filter housing.
4. The filtering container of claim 1 wherein the filter media includes a filter paper, a molded or extruded carbon block, or granulate activated carbon (GAC), or a combination thereof.
5. The filtering container of claim 4 wherein said carbon block or granulated activated carbon is contained within the filter housing between the filter housing and the filter paper.

6. The filtering container of claim 4 wherein said filter paper, carbon block, and/or granulated activated carbon is sized to exclude passage of some or all bacteria, cyst, and virus.

7. The filtering container of claim 1 including a dissolvable coating, powdered liquid, or gel material containing a flavor for mixing with said fluid.

8. The filtering container of claim 4 wherein the filter media includes an antimicrobial agent.

9. The filtering container of claim 1 including perforations or apertures located at said container body second end to provide influent fluid to the filter media.

10. The filtering container of claim 1 wherein the filtering container is made of a flexible plastic sufficient to allow a collapsing or squeezing force on the container body to force fluid through the filter media and upward through the hollow tube.

11. The filtering container of claim 1 wherein said filter housing includes inwardly directed guide ribs or protrusions to center said filter media and allow ingress fluid to enter said filter media radially inwards.

12. A filtering container comprising:
a container body having a first end having a top opening and a second end opposite the first end having a bottom opening;
a container cap having a container cap opening extending therethrough and a mouth piece in fluid communication with the container cap opening, the container cap removably and sealingly engageable with the top opening of the container body;
a filter housing engageable with the second end bottom opening of the container body;
a filter end cap having an end cap opening and attachable to a filter media;
the filter media removably secured within the filter housing and attachable to the filter end cap, the filter media having a fluid egress in fluid communication with the end cap opening;
a hollow tube having first and second ends, and extending from the end cap opening to the container cap opening, wherein the hollow tube includes a flexible, extendable portion intermediate the hollow tube first and second ends and within said container body extendable to a length that allows the hollow tube to be longer than the filtering container body;
wherein the filter housing is engageable with the filter media, the filter media purifying a fluid passing therethrough, and wherein the fluid contained in the container body is drawn through the filter media via an annular gap formed between said filter end cap and said filter housing.

13. The filtering container of claim 12 wherein the container cap includes a strawformed mouthpiece protruding from an external side of said container cap.

14. The filtering container of claim 12 wherein the filtering container is made of a flexible plastic sufficient to allow a collapsing or squeezing force on the container body to force fluid through the filter media and upward through the hollow tube.

15. A filtering container comprising:
a container body having a first end and a second end opposite the first end;
a container cap having an aperture extending therethrough and a mouthpiece in fluid communication with the container cap aperture, the container cap removably and sealingly engageable with the first end of the container body;
a filter housing engageable with the second end of the container body, said filter housing having a hollow inner portion for receiving a filter media;
a filter end cap forming an annular gap with said filter housing and allowing fluid to be drawn to said filter media via said annular gap, said filter end cap attachable to the filter media; and
a hollow tube sealably connected at a first end to an aperture on said filter end cap and sealably connected at an opposite second end to the container cap aperture, said hollow tube extending from the filter end cap to the container cap aperture;
wherein the filter housing is engageable with the filter media, the filter media adapted to purify a fluid passing therethrough when the filtering container is in an upright orientation, and wherein the hollow tube first end is in fluid communication with the filter media, such that fluid contained in the container body is drawable both axially and radially through the filter media, and exits the filter media through the filter end cap aperture to the hollow tube.

* * * * *